(No Model.)
H. P. BROWN.
ARMATURE FOR ELECTRIC MOTORS.
No. 518,562. Patented Apr. 17, 1894.
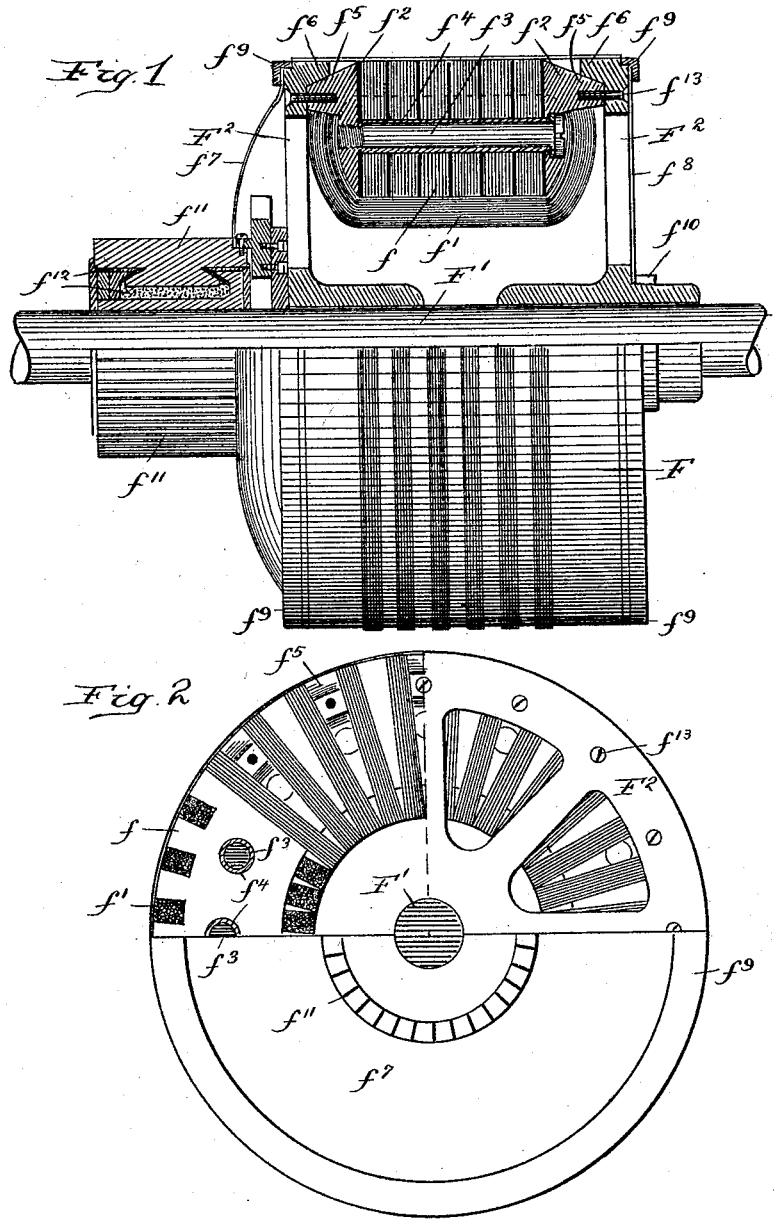

UNITED STATES PATENT OFFICE.

HAROLD P. BROWN, OF NEW YORK, N. Y., ASSIGNOR TO THE EDISON GENERAL ELECTRIC COMPANY, OF SAME PLACE.

ARMATURE FOR ELECTRIC MOTORS.

SPECIFICATION forming part of Letters Patent No. 518,562, dated April 17, 1894.

Application filed February 6, 1893. Serial No. 461,282. (No model.)

*To all whom it may concern:*

Be it known that I, HAROLD P. BROWN, a citizen of the United States, residing in New York, in the county of New York and State of New York, have invented a new and useful Improvement in Armatures for Electric Motors or Machines, of which the following is a specification.

My invention relates to the construction of the revolving armatures for electric motors or other machines.

In the accompanying drawings, which form a part of this specification, and in which similar letters of reference indicate like parts, Figure 1 is a side elevation, partly in radial section of an armature embodying my invention. Fig. 2 is a partial cross section of the same taken in part at different positions longitudinally of the armature shaft, so as to show different parts of the armature in elevation or section.

My improvement consists in the novel devices and novel combinations of parts and devices herein shown and described and more particularly pointed out in the claims.

In the drawings F represents the armature, and F' the armature shaft. The revolving armature F of the motor has a core consisting of a series of separate annular disks or thin rings $f$ around which the coils $f'$ are wound. The soft iron disks $f$ forming the armature are held together by two end-plates $f^2 f^2$ of brass, wrought iron or other suitable material, one on each side, united by screws $f^3$ which are insulated electrically from one or both of the two end plates, as well as from all of the soft iron rings $f$ composing the armature. These screws $f^3$ are of greater diameter than the distance between the coils instead of being smaller and passing between the coils as is the usual practice. The insulation of these screws or bolts $f^3$ is effected by a tube of asbestus, mica or other fire-proof insulating material surrounding each bolt. The end plates $f^2$ are provided on their outer edges with beveled projections $f^5$ which fit in the corresponding beveled or wedging faces or rims $f^6$ of the spiders $F^2$, the hubs of which fit on the shaft of the armature; so that by forcing the spiders together and against the beveled projections $f^5$ of the end-plate, the armature is firmly and solidly held in position, and at the same time centered with the shaft. The beveled rims or flanges $f^6$ on the spiders in connection with the beveled projections $f^5$ on the rings $f^2$ avoid the shearing strain on the bolts, and at the same time permit the use of large bolts and utilize the greatest possible space for the coils of the armature, as the coils are wound over the ends of the bolts $f^3$; and thus increase its efficiency as well as very greatly simplifies its construction. By this means also the armature is given a perfectly rigid and solid construction, rendering it almost as strong as though it were made in one piece.

$f^8 f^8$ represent annular disks of vulc-abeston, or other non-conducting material adapted to resist moisture and heat, which serve the purpose of closing the ends of the armature and thus exclude dirt and moisture therefrom. These disks $f^8 f^8$ are clamped to rim $f^6$ of the spiders by clamping rings $f^9$, and at the center by clamping rings $f^{10}$ on one side and by the commutator $f^{11}$ on the other. The clamping rings $f^9$ may be secured in any suitable manner as by screw threads or by small rivets or screws. They also serve to lock in place the screws $f^{13}$.

The commutator $f^{11}$, (see Fig. 1) has a hollow ring $f^{12}$ which is filled with burned shellac or other insulating lubricant. This acts to prevent a flash of lightning from jumping from segments to the shaft, and at the same time as a reservoir of lubricant and serves to renew the shellac in the mica strips between the segments, thereby preventing the destruction of the surface mica by wear. Mica wears away rapidly when exposed to the sparking on surface of commutator, but is preserved by the presence of shellac, or other gum or lubricant. This lubricant also prevents undue wear of the metal commutator segments $f^{11}$.

The burned shellac hereinbefore referred to may be prepared by taking ordinary gum shellac, wrapping it in a cloth, and then immersing it in hot water and squeezing it into conveniently shaped blocks, and then melting the blocks or sticks of shellac by setting one end on fire, as is done with sticks of sealing wax, and letting the melted shellac flow into the orifice which it is desired to fill, and allowing it to burn there as long as it will. This gives the shellac (burned shellac) a peculiar toughness without hurting its insulating properties. Or, if it is to be used where the shellac must be applied very thin, then the gum shellac can be dissolved in pure alcohol and applied to sheets of asbestus paper and placed between the surfaces it is to insulate. The contiguous metal can then be gradually heated by passing an electric current through it until it is nearly red hot. In this way the alcohol and moisture is driven out and the shellac left in good condition to withstand heat and moisture. A commutator treated in the way first described keeps smooth and glossy even though the brushes may spark badly. The shellac thus treated or burned does in fact act as a lubricant as I have found by practical experience.

I claim—

1. The armature F having a core composed of a series of separate annular disks or thin rings $f$ and coils $f'$ wound thereon, in combination with end plates $f^2$ united by screws or bolts $f^3$, said end plates $f^2$ being provided in their outer edges with beveled projections $f^5$, and spiders $F^2$ having corresponding faces or rims $f^6$ engaging said beveled projections on said end-plates, substantially as specified.

2. The armature F having core composed of a series of separate annular disks or thin rings $f$ and coils $f'$ wound thereon, in combination with clamping end plates $f^2$ united by screws or bolts $f^3$, said screws or bolts being insulated electrically from one or both of the two end plates, and from all of the soft iron rings $f$ composing the armature, by tubes of insulating material $f^4$, said end plates $f^2$ being provided on their upper edges with beveled projections $f^5$, and spiders $F^2$ having corresponding beveled or wedging faces or rims $f^6$ engaging said beveled projections on said clamping rings, substantially as specified.

3. In an armature, the combination with the shaft, spiders and armature rings provided with coils, of annular disks $f^8 f^8$ of non-conducting material adapted to resist moisture and heat, such as vulc-abeston, secured at the ends of the armature to exclude dirt and moisture therefrom, substantially as specified.

4. In an armature, the combination with the shaft, spiders and armature rings provided with coils, of annular disks $f^8 f^8$ of non-conducting material adapted to resist moisture and heat, such as vulc-abeston, secured at the ends of the armature to exclude dirt and moisture therefrom, said disks $f^8 f^8$ being secured to the spiders by clamping rings $f^9$, substantially as specified.

5. The commutator furnished with segments, and having a hollow ring $f^{12}$ containing a gum or lubricant, substantially as specified.

6. A commutator furnished with segments and mica strips between the segments, and provided with a hollow ring or space between the shaft and the segments containing burned shellac, substantially as specified.

7. In an electric motor, the armature having spiders $F^2$ and end plates $f^2$ provided with screws $f^{13}$ uniting said spiders and end plates, in combination with rings $f^9$ secured to said spiders and overlapping said screw $f^{13}$ whereby said screws are locked in place, substantially as specified.

8. The armature having a core composed of a series of separate annular disks or thin rings $f$ and coils $f'$ wound thereon, in combination with clamping end-plates $f^2$ united by screws or bolts $f^3$, said end-plates being provided on their outer edges with projections $f^5$ and spiders $F^2$ having corresponding faces or rims $f^6$ engaging said projections on said end plates, substantially as specified.

HAROLD P. BROWN.

Witnesses:
H. M. MUNDAY,
EDWARD S. EVARTS.